(12) United States Patent
Ganser

(10) Patent No.: US 8,964,287 B2
(45) Date of Patent: Feb. 24, 2015

(54) DEVICE FOR FOCUSING A MICROSCOPE OBJECTIVE ON A SAMPLE

(71) Applicant: Leica Microsystems CMS GmbH, Wetzlar (DE)

(72) Inventor: Michael Ganser, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 14/171,614

(22) Filed: Feb. 3, 2014

(65) Prior Publication Data

US 2014/0153089 A1    Jun. 5, 2014

Related U.S. Application Data

(63) Continuation of application No. 13/300,359, filed on Nov. 18, 2011, now abandoned.

(30) Foreign Application Priority Data

Nov. 26, 2010   (DE) .......................... 10 2010 060 841

(51) Int. Cl.
*G02B 21/26*   (2006.01)
*G02B 21/24*   (2006.01)

(52) U.S. Cl.
CPC .............. *G02B 21/26* (2013.01); *G02B 21/241* (2013.01)
USPC .......................................... 359/383; 359/368

(58) Field of Classification Search
CPC ........ G02B 21/24–21/248; G02B 7/02–7/028; G02B 21/00–21/0096
USPC ......................................... 359/368–398, 824
See application file for complete search history.

(56) References Cited

U.S. PATENT DOCUMENTS 3,915,560  A  *  10/1975  Levine et al. ................. 359/824
6,438,856  B1     8/2002  Kaczynski
(Continued)

FOREIGN PATENT DOCUMENTS

DE   19949044   5/2001
DE   20106834   8/2001
(Continued)

OTHER PUBLICATIONS

"Opti 510L—Fundamentals of Applied Optics Lab", Nov. 4, 2009, XP007920148, Internet: URL:http://web.archive.org/web/20091104215932/http://www.optics.arizona.edu/opti5101.
(Continued)

*Primary Examiner* — Suchin Parihar
*Assistant Examiner* — Jeffrey Madonna
(74) *Attorney, Agent, or Firm* — Schlee IP International, P.C.; Alexander R. Schlee

(57) ABSTRACT

A device for focusing a microscope objective on a sample accurately with a high spatial resolution. The device has a positioning unit having a main body, an objective holder movably supported on the main body and adapted to hold the microscope objective, and an actuator for moving the objective holder along the optical axis of the microscope objective. The objective holder holds the microscope objective only at a front portion of the microscope objective facing the sample. The positioning unit includes one or more lever arms, each of which coupled at its one end via a first flexure bearing to the main body and at its other end via a second flexure bearing to the objective holder. The main body of the positioning unit is attached to a stage that carries the sample.

5 Claims, 1 Drawing Sheet

(56) References Cited

U.S. PATENT DOCUMENTS

| | | |
|---|---|---|
| 6,731,327 B1 | 5/2004 | Kujawa et al. |
| 2002/0015225 A1 | 2/2002 | Ue |
| 2004/0017620 A1* | 1/2004 | Kaneko et al. ............. 359/824 |
| 2006/0141613 A1* | 6/2006 | Tsuchiya et al. ........... 435/288.7 |
| 2006/0164721 A1* | 7/2006 | Uhl et al. .................... 359/368 |
| 2009/0284853 A1 | 11/2009 | Griffiths et al. |
| 2010/0091363 A1 | 4/2010 | Kawahito |
| 2010/0110540 A1* | 5/2010 | Niv et al. .................... 359/380 |

FOREIGN PATENT DOCUMENTS

| | | |
|---|---|---|
| DE | 102004057451 | 6/2006 |
| DE | 102008007773 | 8/2009 |
| EP | 1092944 | 4/2001 |
| EP | 1418456 | 5/2004 |
| EP | 2120081 | 11/2009 |
| JP | 61134934 | 6/1986 |
| JP | 02087108 | 3/1990 |
| JP | 11271631 | 10/1999 |
| WO | 2006056178 | 6/2006 |

OTHER PUBLICATIONS

Burge, Jim H.: "An Easy Way to Relate Optical Element Motion to System Pointing Stability, Internet: http://www.optics.arizona.edu/opti5101/references/6288-18%20rev%20E.pdf", College of Optical Sciences Univeristy of Arizona, Tucson, AZ 85721, USA.

NonFinal Office Action dated Mar. 19, 2013 issued in U.S. Appl. No. 13/300,359.

Reply dated Jul. 15, 2013 in reply to the NonFinal Office Action dated Mar. 19, 2013 issued in U.S. Appl. No. 13/300,359.

Final Office Action dated Oct. 1, 2013 issued in U.S. Appl. No. 13/300,359.

* cited by examiner

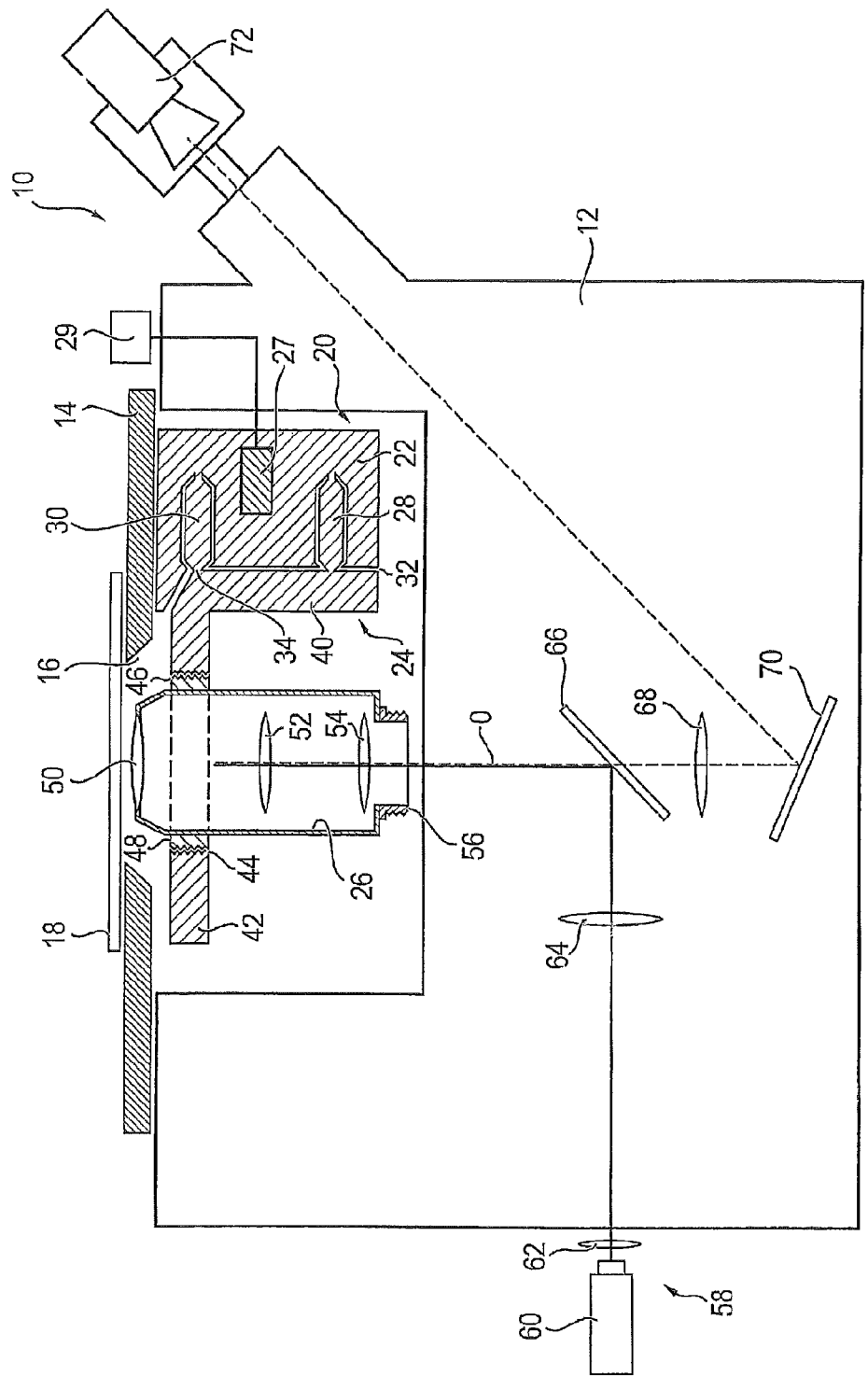

DEVICE FOR FOCUSING A MICROSCOPE OBJECTIVE ON A SAMPLE

CROSS-REFERENCE TO RELATED APPLICATION

This is a Continuation application claiming benefit of the United States non-provisional patent application Ser. No. 13/300,359 that claims the priority of the German patent application DE 102010060841.6 having a filing date of Nov. 26, 2010. The entire content of this prior German patent application 102010060841.6 and of the parent application Ser. No. 13/300,359 is herewith incorporated by reference.

BACKGROUND OF THE INVENTION

The present invention relates to a device for focusing a microscope objective on a sample, the device including a positioning unit having a main body, an objective holder movably supported on the main body and adapted to hold the microscope objective, and an actuator for moving the objective holder along the optical axis of the microscope objective.

In high-resolution light microscopy, it is particularly important that the microscope objective be held in a stable and precise position in the imaging beam path. For example, the spatial resolutions to be achieved in modern light microscopic methods are desired to be below 50 nm in a lateral direction; i.e., perpendicular to the optical axis of the microscope objective. Therefore, unintentional relative lateral movements between the sample and the microscope objective, which may result, for example, from temperature fluctuations, are to be avoided to the extent possible. This holds especially true for a number of methods which use imaging times of several minutes, during which even the smallest displacements of the microscope objective perpendicular to the optical axis would together result in image offset and, thus, in a correspondingly reduced lateral resolution.

In addition, in the light microscopic methods of the aforementioned type, the microscope objective must be focused on the sample with particularly high accuracy. The travel of the microscope objective along the optical axis is typically on the order of about 100 µm. Among the positioning units used in microscopes to cause the focusing movement of the microscope objective along the optical axis, increasing use is made of high-precision MEMS devices which include a main body, an objective holder movably supported on the main body, and an (for example, piezoceramic) actuator for precisely moving the objective holder, and thus microscope objective, along the optical axis so as to focus the microscope objective on the sample.

A conventional microscope objective is usually threaded at its rear end; i.e., the end facing away from the sample. This thread is used, for example, to screw the microscope objective into a commercially available objective turret. When using a positioning unit of the aforementioned type, this microscope thread is used to screw the microscope objective at its rear end into the objective holder, possibly with a suitable adapter positioned therebetween.

In the prior art, there are known various other approaches which aim to ensure that the microscope objective is held in as stable a position as possible and focused with high accuracy. For example, U.S. Patent Application No. 2002/0015225 describes a microscope in which the sample holder and the focusing unit are mounted directly on the microscope objective. However, this has the disadvantage that easy changing of microscope objectives is no longer possible. Moreover, manipulation of the sample has a direct effect on the focusing unit, which may impair the focusing accuracy.

European Patent Application EP 1 418 456 A1 describes a microscope in which unwanted deviations of the position of the microscope objective perpendicular to the optical axis are to be prevented by a rotationally symmetrical configuration around the optical axis and the use of optical components whose thermal expansion coefficients are suitably matched to each other.

International Patent Application published under the publication number WO 2006/056178 A1 discloses a microscope objective which is integrated into a sample stage by means of a guide sleeve. However, while this does increase the stability along the optical axis, there is a not negligible play of the microscope objective within the guide sleeve in a direction perpendicular to the optical axis.

U.S. Pat. No. 6,731,327 B1 describes a positioning unit for moving a microscope objective along the optical axis. This positioning unit has a clamping device that additionally stabilizes the microscope objective in its operating position. However, providing the clamping device makes this a relatively complex design.

From the German Patent Application published under the publication number DE 199 49 044 A1 there is known a device for fine positioning of a microscope objective using a double parallel spring element. The double parallel spring element acts on the end of the microscope objective that faces away from the sample, as a result of which the opposite free end of the microscope objective facing the sample may tilt to a not negligible degree, leading to unwanted image offset and a correspondingly reduced spatial resolution.

From the U.S. patent application published under the publication number US 2009/0284853 A1 a focusing device is known, comprising a pair of leaf springs, each of which is coupled with one end to a main body and with the other end to an objective holder. The objective holder is formed by an external thread arranged on the outer surface of the lens barrel and a nut engaged with the external thread.

In the U.S. patent application published under the publication number US 2010/0091363 A1 an objective holder is described, with which one of a plurality of objectives can be selectively brought into the microscope beam path. The plurality of objectives respectively have a contact surface arranged along the optical axis at the same height, which contacts a corresponding, fixed contact surface, so that parfocality between the various objectives is provided.

SUMMARY OF THE INVENTION

It is an object of the present invention to provide a device that allows a microscope objective to be accurately focused on a sample with a high spatial resolution.

According to an aspect of the invention, this object is achieved by a device for focusing a microscope objective on a sample, comprising: a positioning unit having a main body, an objective holder movably supported on the main body and adapted to hold the microscope objective, and an actuator for moving the objective holder along the optical axis of the microscope objective; wherein the objective holder holds the microscope objective only at a front portion of the microscope objective facing the sample; the positioning unit includes one or more lever arms, each of which coupled at its one end via a first flexure bearing to the main body and at its other end via a second flexure bearing to the objective holder; and the main body of the positioning unit is attached to a stage that carries the sample.

DETAILED DESCRIPTION OF THE INVENTION

Thus, in contrast to the conventional systems where the microscope objective is held at the rear end; i.e., the end facing away from the sample (and usually by the thread provided at that end), it is a feature of the present invention that the microscope objective is held at a front portion facing the sample, which is where the so-called front lens is located. This is because it has been found that stabilizing the objective at its front end, as proposed by the present invention, has advantages over the conventional method of stabilizing it at its rear end when it comes to achieving the highest possible level of lateral resolution.

In a microscope objective, there is always a tilt-tolerant plane perpendicular to the optical axis, in which tilting of the microscope objective perpendicular to the optical axis does, at least in a first approximation, not result in image offset. This plane coincides with the first principal plane of the objective optical system. The exact position of the plane depends on the specific design of the microscope objective, and especially on the specific arrangement and number of lenses in the objective. However, as for a high-magnification microscope objective used in high-resolution microscopy, which, having a total length of about 1.7 Inch to 2.6 Inch (about 45 to 65 mm), has a focal length of only a few millimeters, it can definitely be said that the tilt-tolerant plane lies in the front portion of the objective, which faces the sample. This front portion contains the above-mentioned front lens as the first lens facing the sample, as viewed from the sample. Therefore, in a practical implementation of the present invention, in order to significantly improve the lateral resolution, it will in all cases be sufficient that the objective holder engage the microscope objective as far forward as possible under the given conditions.

The positioning unit has one or more lever arms, each of which is coupled at its one end via a first flexure bearing to the main body and at its other end via a second flexure bearing to the objective holder. In this embodiment, the positioning unit is a single-piece component, the rigid portions of which are constituted by the main body and the objective holder and are movable relative to each other by way of flexure bearings. The flexure bearings are each constituted by a portion of the component that has a reduced bending resistance compared to adjacent portions. This reduced bending resistance may be achieved, for example, by locally reducing the cross section of the material constituting the component.

In an advantageous embodiment, two lever arms are arranged parallel to one another and, together with the main body and the objective holder, form a parallelogram configuration. Such a parallelogram configuration enables a precise positioning movement of the objective holder along the optical axis with very little unwanted movement perpendicular to the optical axis. To this end there is provided the actuator, which exerts a force on the lever arms, causing a controlled movement of the parallelogram configuration.

The main body of the positioning unit is attached to a stage which carries the sample. In this embodiment, the front portion of the microscope objective, which faces the sample, is coupled via the positioning unit to the sample placed on the stage. This advantageously results in a short coupling distance between the microscope objective and the sample, which avoids excessive relative movement between the microscope objective and the sample, particularly relative movement caused by temperature changes.

In another advantageous embodiment, the actuator is a piezoceramic element which is integrated into the main body of the positioning unit. Such a piezoceramic element is capable of very precisely moving the objective holder along the optical axis.

Preferably, the objective holder includes a ring having an internal thread, and the microscope objective has an external thread on at its front portion facing the sample, the internal thread of the ring being threaded onto said external thread. This holding arrangement for the microscope objective, which is rotationally symmetric with respect to the optical axis, further reduces displacements perpendicular to the optical axis.

In accordance with a further aspect of the present invention, there is provided a microscope having a device for focusing a microscope objective.

The present invention is described below in more detail with reference to an exemplary embodiment.

BRIEF DESCRIPTION OF THE DRAWINGS

FIG. 1 shows a high-resolution light microscope constituting an exemplary embodiment of the present invention.

DETAILED DESCRIPTION OF THE DRAWINGS

The light microscope generally designated 10 in the FIG. 1 includes an inverted stand 12, on which is placed a stage 14 having an opening 16 extending therethrough. A sample 18 is placed on stage 14 in such a way that it covers opening 16. A positioning unit 20 is attached to the underside of stage 14.

Positioning unit 20 includes a main body 22 and an objective holder 24 movably supported on main body 22. A microscope objective 26 is held on objective holder 24. A piezoceramic actuator 27 integrated into main body 22 and shown only schematically in the FIG. 1 is capable of moving objective holder 24 along an optical axis O so as to, in turn, move objective 26 along optical axis O in order to focus it on sample 18. Actuator 27 is connected to a control unit 29. The control signals of said control unit are used to generate the movements of actuator 27, which in turn move objective holder 24. In the present exemplary embodiment, control unit 29 is located outside of stand 12. However, it may also be integrated into stand 12.

The following first describes positioning unit 20 in detail.

Objective holder 24 is movably supported on main body 22 by lever arms 28 and 30. In the present exemplary embodiment, positioning unit 20 is a single-piece component, whose elements, namely main body 22, objective holder 24 as well as lever arms 28 and 30, are movable relative to each other and separated from one another by cavities 32 formed in the material. Cavities 32 are configured in positioning unit 20 in such a way that in the region of the longitudinal ends of lever arms 28 and 30, the material constituting positioning unit 20 has regions of locally reduced cross section defining flexure bearings. For the sake of clarity, only one of the flexure bearings is denoted by reference numeral 34 in the FIG. 1.

Due to the aforementioned regions of locally reduced cross section, the bending resistance of flexure bearings 34 in a direction parallel to optical axis O is significantly reduced compared to the bending resistance transverse to optical axis O. Because of this reduced bending resistance, flexure bearings 34 enable objective holder 24 to be moved relative to main body 22 along optical axis O by way of the lever arms 28 and 30. Thus, objective holder 24, main body 22 and the two lever arms 28 and 30 together form a parallelogram-type configuration. The fixed base of the parallelogram is provided by main body 22, while the three remaining movable sides of the parallelogram are formed by objective holder 24 and the two lever arms 28 and 30.

In this connection, it should be noted that the magnitude of the positioning movement of objective holder 24 along optical axis O is no greater than about 100 µm. At this very small positioning movement, the unintentional movement of objective holder 24 perpendicular to optical axis O, which is caused by the above-described parallelogram configuration, is of negligible magnitude.

Objective holder 24 is formed by an elongated portion 40 extending parallel to optical axis O and a ring 42 extending from elongated portion 40 in a direction perpendicular to optical axis O. Ring 42 has an internal thread 44, which is rotationally symmetric with respect to optical axis O. This internal thread 44 is threadedly engaged with an external thread 46 formed on an annular collar 48 of microscope objective 26. Annular collar 48 is disposed at a front portion of microscope objective 26 that faces sample 18. Accordingly, microscope objective 26 is coupled at its front portion to positioning unit 20.

Thus, in the present exemplary embodiment, microscope objective 26 is held at a position immediately proximate the objective lens that immediately faces sample 18. In the FIGURE, this lens, which is also referred to as "front lens", is denoted by reference numeral 50. Of course, microscope objective 26 includes additional lenses, which are schematically indicated in the FIGURE by reference numerals 52 and 54.

Like a conventional objective, microscope objective 26 also has an objective thread 56 at its rear end; i.e., the end facing away from sample 18. Objective thread 56 is used, for example, for adjustment during manufacture.

Light microscope 10 further has an illumination device 58 including a light source 60 and lenses 62 and 64. The fluorescence excitation light from light source 60 passes through lenses 62 and 64 and is reflected by a dichroic mirror 66 along optical axis O and into objective 26. The fluorescent light coming from sample 18 passes through front lens 50 and further lenses 52 and 54 of microscope objective 26 to semitransparent mirror 66, which allows the fluorescent light to pass therethrough toward an additional lens 68. The fluorescent light passing through lens 68 is finally reflected by a mirror 70 into a camera 72 attached to stand 12.

It will be readily understood that the embodiment described above is for illustrative purposes only. For example, it is also possible to use a positioning unit other than the single-piece unit 20 provided with flexure bearings 34. It is possible to use, for example, a spring arrangement which is driven by an external actuator so as to move microscope objective 26 along optical axis O and thereby focus it.

Also, objective holder 24 may be coupled to microscope objective 26 in a way other than by two meshing threads 44 and 46 as shown in the FIGURE. What is essential to the present invention is that microscope objective 26 is held at its front portion facing sample 18.

LIST OF REFERENCE NUMERALS 10 light microscope
12 stand
14 stage
16 opening
18 sample
20 positioning unit
22 main body
24 objective holder
26 microscope objective
27 actuator
28 lever arm
29 control unit
30 lever arm
32 cavity
34 flexure bearing
40 elongated portion
42 ring
44 internal thread
46 external thread
48 annular collar
50 front lens
52 lens
54 lens
56 objective thread
58 illumination device
60 light source
62 lens
64 lens
66 dichroic mirror
68 lens
70 mirror
72 camera

The invention claimed is:

1. A microscope comprising a microscope objective, a stage on which a sample is placed, and a focusing device for focusing a microscope objective on the sample that is positioned on a stage, said focusing device comprising:
   a positioning unit having a main body;
   an objective holder movably supported on the main body for holding the microscope objective; and
   an actuator for moving the objective holder along the optical axis of the microscope objective; wherein
   the objective holder holds the microscope objective only at a front portion of the microscope objective facing the sample;
   the positioning unit comprises one or more lever arms, each of which having a first end and a second end and is coupled at its first end via a first elastic solid state hinge to the main body and at its second end via a second elastic solid state hinge to the objective holder;
   the positioning unit is made from a material as a single-piece component including the main body, objective holder and lever arms, said main body, objective holder and lever arms being movable relative to each other and separated from one another by cavities formed in the material, said cavities providing in the region of the first and second ends of the one or more lever arms regions of locally reduced lever arm cross sections defining the elastic solid state hinges; and
   the main body of the positioning unit is attached to the stage on which the sample is arranged.

2. The device according to claim 1, further comprising two lever arms arranged parallel to one another and forming together with the main body and the objective holder a parallelogram configuration.

3. The device according to claim 1, wherein the actuator is a piezoceramic element that is integrated into the main body of the positioning unit.

4. The device according to claim 1, wherein
   the objective holder includes a ring having an internal thread;
   the microscope objective has an external thread on its front portion facing the sample; and
   the internal thread of the ring is threaded onto said external thread.

5. The device according to claim 1, wherein
the total length of the microscope objective along the optical axis lies in a range from 1.7 inch to 2.6 inch;
the length of the front portion facing the sample at which the microscope objective is held ranges from 0.1 to 0.4 inch along the optical axis; and
the focal length of the microscope objective is in the range from 0.1 to 0.2 inch.

* * * * *